(12) United States Patent
Asano et al.

(10) Patent No.: US 11,664,701 B2
(45) Date of Patent: May 30, 2023

(54) MOTOR AND BRUSH HOUSING PART

(71) Applicant: PANASONIC INTELLECTUAL PROPERTY MANAGEMENT CO., LTD., Osaka (JP)

(72) Inventors: Takahiro Asano, Osaka (JP); Hirofumi Mizukami, Osaka (JP); Yasuharu Uchida, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 147 days.

(21) Appl. No.: 17/294,784

(22) PCT Filed: Nov. 12, 2019

(86) PCT No.: PCT/JP2019/044245
§ 371 (c)(1),
(2) Date: May 18, 2021

(87) PCT Pub. No.: WO2020/105501
PCT Pub. Date: May 28, 2020

(65) Prior Publication Data
US 2022/0014070 A1    Jan. 13, 2022

(30) Foreign Application Priority Data
Nov. 22, 2018    (JP) .............................. JP2018-219619

(51) Int. Cl.
*H02K 5/14*    (2006.01)
*H01R 39/38*    (2006.01)
*H01R 39/40*    (2006.01)

(52) U.S. Cl.
CPC ........... *H02K 5/148* (2013.01); *H01R 39/381* (2013.01); *H01R 39/40* (2013.01)

(58) Field of Classification Search
CPC .... H01R 39/38; H01R 39/381; H01R 39/385; H01R 39/39; H01R 39/40; H02K 1/17;
(Continued)

(56) References Cited

U.S. PATENT DOCUMENTS

| 4,926,075 A | 5/1990 | Fushiya et al. |
| 5,907,207 A | 5/1999 | Peot et al. |
| 2019/0199180 A1 | 6/2019 | Huber et al. |

FOREIGN PATENT DOCUMENTS

| JP | S56-108358 U | * | 8/1981 |
| JP | S56-108358 U | | 8/1981 |

(Continued)

OTHER PUBLICATIONS

International Search Report and Wrriten Opinion issued in International Patent Application No. PCT/JP2019/044245, dated Jan. 21, 2020; with partial English translation.

*Primary Examiner* — Ahmed Elnakib
*Assistant Examiner* — Joshua Kiel M Rodriguez
(74) *Attorney, Agent, or Firm* — McDermott Will & Emery LLP (57) ABSTRACT

A motor includes a commutator, a brush, a first spring, a second spring, and a holder. The brush is configured to come into contact with the commutator to be electrically connected to the commutator. The first spring is configured to push the brush along the first direction toward the commutator. The second spring pushes the brush along a second direction intersecting the first direction. The holder is disposed such that the brush is located between the holder and the second spring in the second direction. The holder holds the brush between the holder and the second spring.

8 Claims, 7 Drawing Sheets

(58) Field of Classification Search
CPC ...... H02K 1/2789; H02K 5/146; H02K 5/148;
H02K 13/006; H02K 13/10
See application file for complete search history.

(56) References Cited

FOREIGN PATENT DOCUMENTS

| | | | |
|---|---|---|---|
| JP | H01-218340 A | | 8/1989 |
| JP | 2008-092679 A | | 4/2008 |
| JP | 2008092679 A | * | 4/2008 |
| JP | 2009-296816 A | | 12/2009 |
| JP | 2014-239584 A | | 12/2014 |
| WO | 2018/019725 A1 | | 2/2018 |

* cited by examiner

MOTOR AND BRUSH HOUSING PART

CROSS-REFERENCE OF RELATED APPLICATIONS

This application is the U.S. National Phase under 35 U.S.C. § 371 of International Patent Application No. PCT/JP2019/044245, filed on Nov. 12, 2019, which in turn claims the benefit of Japanese Application No. 2018-219619, filed on Nov. 22, 2018, the entire disclosures of which Applications are incorporated by reference herein.

TECHNICAL FIELD

The present disclosure relates to motors and brush housing parts, and specifically, to a motor including a commutator and a brush which comes into contact with the commutator and to a brush housing part which houses the brush.

BACKGROUND ART

Patent Literature 1 describes a brush card assembly provided to a motor (an electric motor). The brush card assembly described in Patent Literature 1 includes: a brush card which has a disk shape and which has a central part having a pore; a brush which is in the shape of a rod and which is disposed on the brush card with one end surface of the brush facing the center of the pore; and a pressurizing member which is a wire rod having one end held by the brush card and the other end being in contact with the other end surface of the brush. The pressurizing member is a coil spring. The pressurizing member applies force to the brush, thereby temporarily fixing the brush to the brush card.

However, in the brush card assembly described in Patent Literature 1, the magnitude of the force applied by the pressurizing member to the brush may be insufficient, and in this case, for example, application of a vibration to the brush card assembly may displace the brush from a prescribed location on the brush card.

CITATION LIST

Patent Literature

Patent Literature 1: JP 2014-239584 A

SUMMARY OF INVENTION

It is an object of the present disclosure to provide: a motor configured to easily hold a brush; and a brush housing part.

A motor according to one aspect of the present disclosure includes a commutator, a brush, a first spring, a second spring, and a holder. The brush is configured to come into contact with the commutator to be electrically connected to the commutator. The first spring is configured to push the brush along a first direction toward the commutator. The second spring is configured to push the brush along a second direction intersecting the first direction. The holder is disposed such that the brush is located between the holder and the second spring in the second direction. The holder is configured to hold the brush between the holder and the second spring.

A brush housing part according to one aspect of the present disclosure is applied to a motor including a brush and a first spring having a part configured to move along a first direction while generating a prescribed trajectory and to push the brush, the brush housing part housing the brush. The brush housing part has a groove through which the part passes in the course of movement of the part along the prescribed trajectory.

DESCRIPTION OF EMBODIMENTS

A motor and a brush housing part according to an embodiment will be described below with reference to the drawings. Note that the embodiment described below is a mere example of various embodiments of the present disclosure. Various modifications may be made to the following embodiment depending on design and the like as long as the object of the present disclosure is achieved. Moreover, figures described in the following embodiment are schematic views, and therefore, the ratio of sizes and the ratio of thicknesses of components in the drawings do not necessarily reflect actual dimensional ratios.

Figure 1:
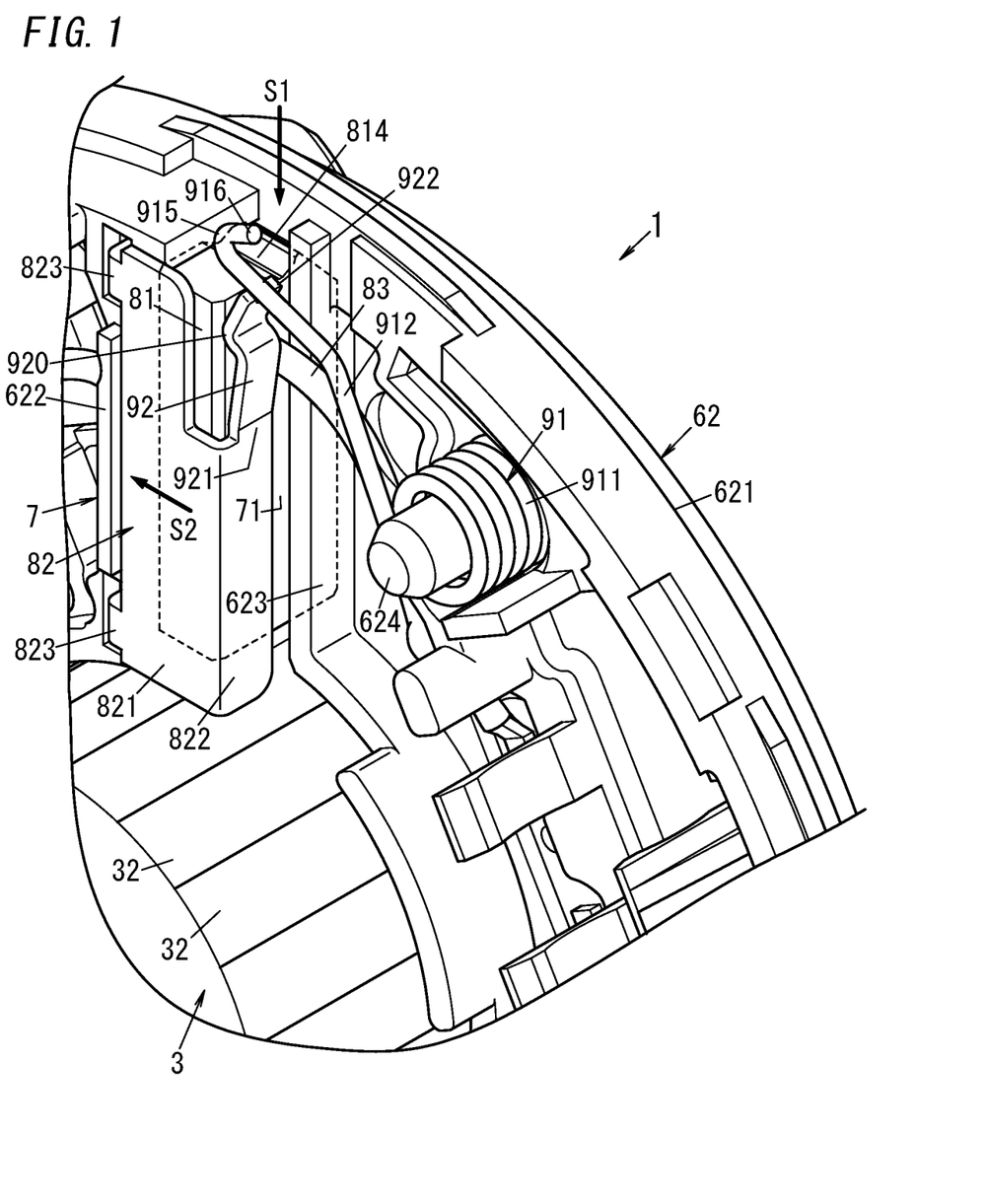
FIG. 1 is a perspective view illustrating a main part of a motor according to an embodiment with a first spring being hooked on a second spring.
Figure 2:
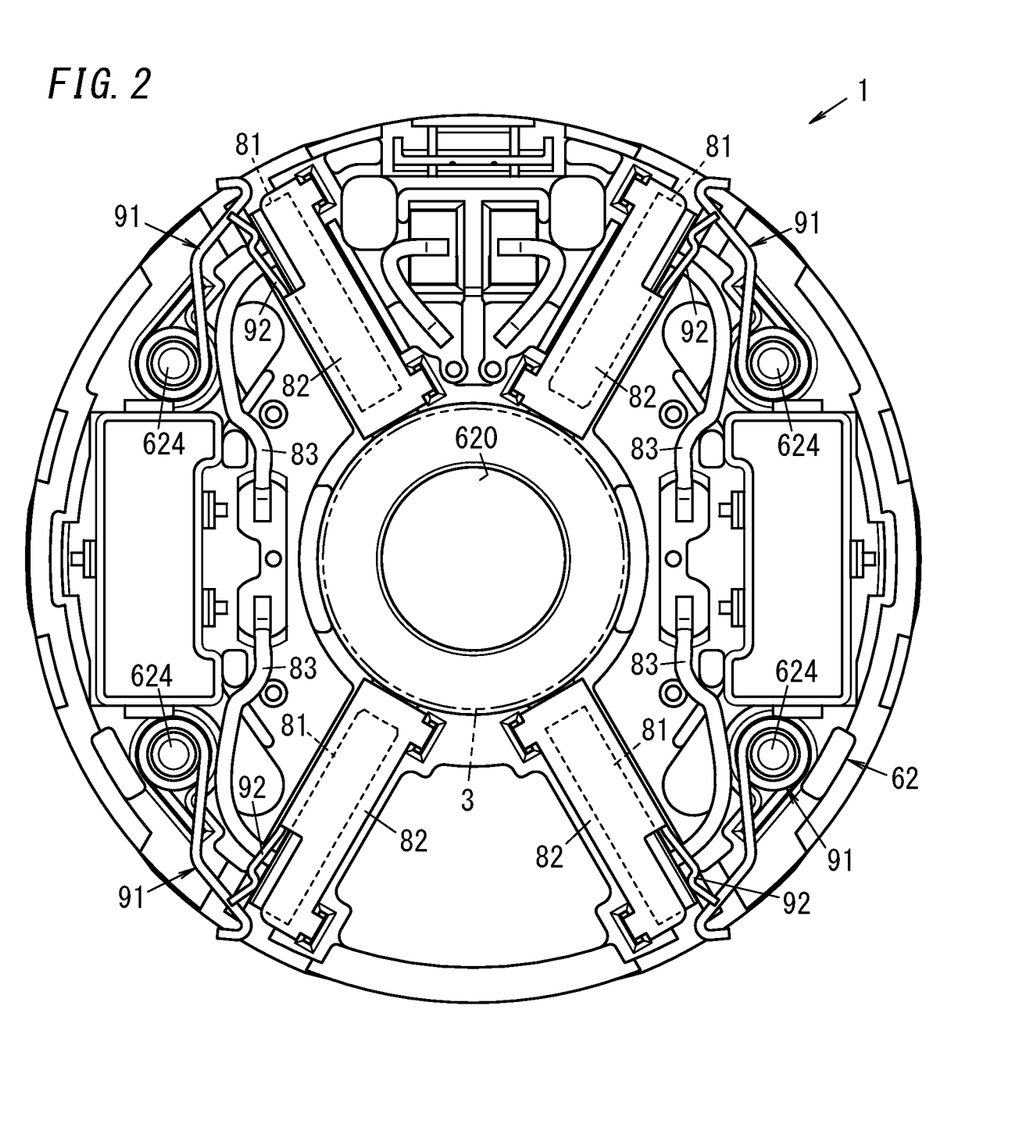
FIG. 2 is a plan view illustrating a main part of the motor.
Figure 3:
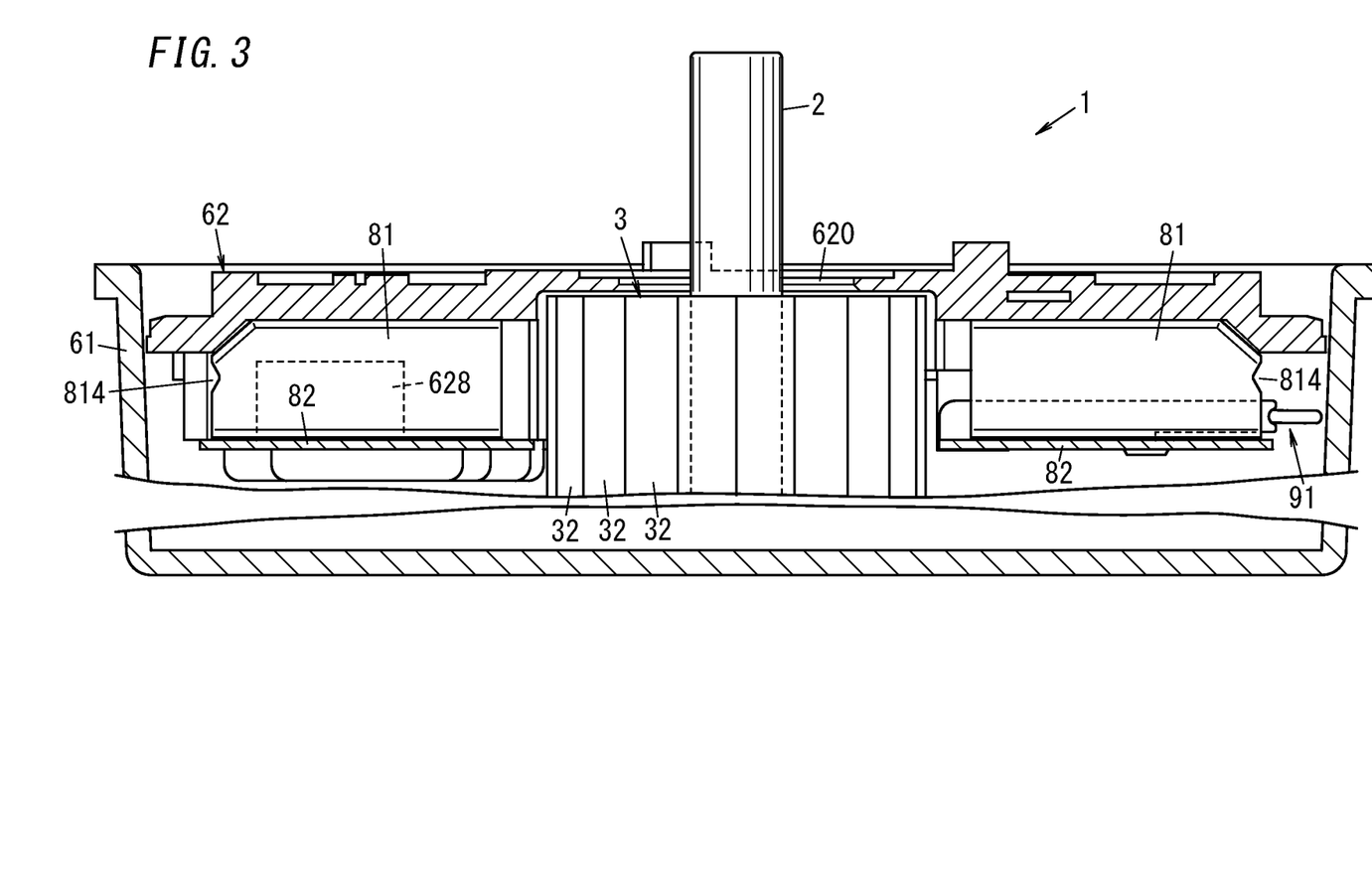
FIG. 3 is a sectional view illustrating a main part of the motor.

A motor 1 (see FIGS. 1 and 2) of the present embodiment is a direct current commutator motor. As illustrated in FIGS. 1 to 3, the motor 1 includes a commutator 3, a plurality of (in FIG. 2, four) brushes 81, a plurality of (in FIG. 2, four) first springs 91, and a plurality of (in FIG. 2, four) second springs 92. The motor 1 further includes a shaft 2, a core, a winding wire wound around the core, a base 61, an end member 62, a field pole, a plurality of (in FIG. 2, four) brush covers 82, and a plurality of (in FIG. 2, four) cables 83. In FIGS. 1 and 2, only the end member 62 and some components attached to the end member 62 are shown.

The motor 1 includes an armature including the shaft 2, the commutator 3, the core, and the winding wire. The armature constitutes a rotor. The motor 1 further includes a stator including the field pole, the base 61, the end member 62, the brushes 81, the brush covers 82, the first springs 91, and the second springs 92. The armature (the rotor) is supplied with a current from an outer side of the motor 1, receives Lorentz force generated by magnetic field generated by the field pole, and rotates with respect to the stator.

The base 61 has a bottomed cylindrical shape. The base 61 houses part of the shaft 2, the commutator 3, the core, the winding wire, the field pole, the brushes 81, and the brush covers 82. The end member 62 has a plate shape. The end member 62 covers an opening end of the base 61.

The shaft 2 has a columnar shape. The shaft 2 is an output shaft of the motor 1. The shaft 2 is rotatably supported by the base 61 and the end member 62.

The commutator 3 and the core are fixed to the shaft 2. The shaft 2 couples the commutator 3 and the core to each other. The shaft 2 is inserted in an insertion hole 620 formed in the end member 62. Thus, part of the shaft 2 protrudes outside a space surrounded by the base 61 and the end member 62.

The commutator 3 includes a plurality of commutator pieces 32. Each commutator piece 32 has one surface constituting an outer peripheral surface of the commutator 3 having a cylindrical shape.

Each commutator piece 32 is made of a metal material such as copper. Each commutator piece 32 has a plate shape. Each commutator piece 32 has a rectangular shape. Each commutator piece 32 has a longitudinal direction along a longitudinal direction of the shaft 2. The commutator pieces 32 are arranged in a circle around the shaft 2. The commutator pieces 32 are apart from each other. The commutator pieces 32 are at equal intervals.

Each commutator piece 32 is electrically connected to the winding wire. Each commutator piece 32 is mechanically and electrically connected to the winding wire by, for example, welding such as heat welding. The winding wire is electrically connecting the commutator pieces 32 to each other.

The winding wire is, for example, an enamel wire. The winding wire includes a linear conductor and an insulating cover covering the conductor. The winding wire has a part from which the insulating cover has been removed and which is electrically connected to each commutator piece 32.

The core is made of a magnetic material such as iron. The core and the commutator 3 are aligned in the longitudinal direction of the shaft 2. The core is on the right of the commutator 3 on the plane of FIG. 3.

The field pole includes a plurality of permanent magnets. The permanent magnets are fixed to the base 61 to surround the core. That is, the permanent magnets are arranged on the base 61 to form an annular shape surrounding the core when viewed in the longitudinal direction of the shaft 2. The core rotates together with the commutator 3 and the shaft 2, and in doing so, the core rotates in a space surrounded by the permanent magnets.

The motor 1 has a power supply circuit which causes a current to flow through each brush 81. The brushes 81 come into contact with the commutator pieces 32 of the commutator 3, and thereby, the brushes 81 are electrically connected to the commutator pieces 32. In the motor 1, a current flows from the power supply circuit via the brushes 81 and the commutator pieces 32 to the winding wire.

The number of each of the brushes 81, the brush covers 82, the cables 83, the first springs 91, and the second springs 92 is four. One brush cover 82, one cable 83, one first spring 91, and one second spring 92 correspond to one brush 81. The following description is focused on one brush 81 of the plurality of brushes 81, and one brush cover 82, one cable 83, one first spring 91, and one second spring 92 corresponding to the one brush 81. Remaining three brushes 81, brush covers 82, cables 83, first springs 91, and second springs 92 have similar configurations.

Figure 4:
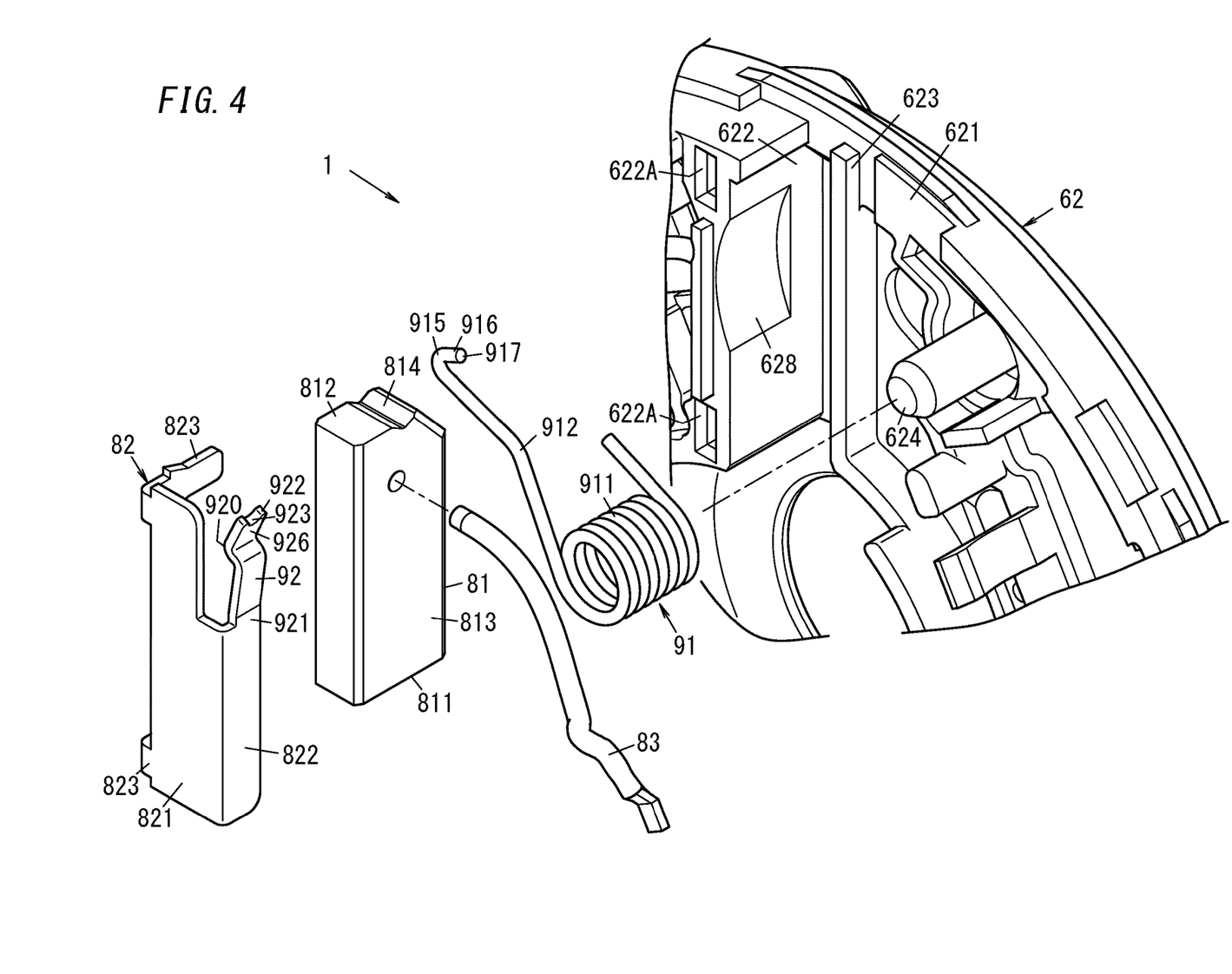
FIG. 4 is an exploded perspective view illustrating a main part of the motor.

The brush 81 is made of a material such as black lead. As illustrated in FIG. 4, the brush 81 is in the form of a rectangular parallelepiped. The brush 81 is electrically connected via the cable 83 to a choke coil of the motor 1. The choke coil is connected to the power supply circuit of the motor 1. The current output from the power supply circuit is subjected to noise reduction by the choke coil and then flows to the brush 81.

The brush cover 82 covers the brush 81. The brush cover 82 includes a first side wall 821, a second side wall 822, and a plurality of (in FIG. 4, two) pawls 823. The first side wall 821 and the second side wall 822 each have a rectangular plate shape. The first side wall 821 faces a bottom plate 621 substantially in parallel in a state where the brush cover 82 is attached to a holder 622 (which will be described later). The second side wall 822 extends from one edge in a short direction of the first side wall 821 toward the bottom plate 621 in a state where the brush cover 82 is attached to the holder 622. The brush cover 82 is made of a material such as metal.

The end member 62 includes the bottom plate 621, a plurality of (in the present embodiment, four) holders 622, and a plurality of (in the present embodiment, four) ribs 623. The brushes 81 correspond to the respective holders 622 and the respective ribs 623. The following description is focused on one brush 81 and one holder 622 and one rib 623 corresponding to the one brush 81, but remaining three holders 622 and ribs 623 have similar configurations. The end member 62 is made of a material such as a resin.

The bottom plate 621 has a disk shape. The holder 622 and the rib 623 protrude from the bottom plate 621 in a thickness direction of the bottom plate 621. The holder 622 and the rib 623 are each in the form of a rectangular parallelepiped. The holder 622 has a plurality of (in FIG. 4, two) recesses 622A recessed in the thickness direction of the bottom plate 621. The recesses 622A correspond to the pawls 823 of the brush cover 82 on a one-to-one basis. Each of the pawls 823 is inserted into a corresponding one of the recesses 622A. The holder 622 and the rib 623 face each other substantially in parallel. The brush 81 is disposed between the holder 622 and the rib 623 in a state where the brush 81 is covered with the brush cover 82. The pawls 823 of the brush cover 82 are inserted in the recesses 622A of the holder 622, and thereby, the brush cover 82 is attached to the holder 622.

The brush 81 is disposed in a space surrounded by part of the bottom plate 621, the holder 622, the rib 623, and the brush cover 82. That is, these components constitute a brush housing part 7 (see FIG. 1) which houses the brush 81.

As illustrated in FIG. 1, the brush 81 is disposed such that a longitudinal direction of the brush 81 is along longitudinal directions of the first side wall 821 and the second side wall 822 of the brush cover 82. Moreover, the longitudinal direction of the brush 81 is also along longitudinal directions of the holder 622 and the rib 623. The brush 81 has a tip end (a lower end in FIG. 1) in the longitudinal direction, and the tip end faces the commutator 3.

The first spring 91 is a helical torsion spring. The first spring 91 has a helical coil part 911 and an arm 912 extending from the coil part 911. In this embodiment, the end member 62 further includes a plurality of (in FIG. 2, four) support columns 624 (see FIG. 2) protruding from the bottom plate 621. The motor 1 includes the four first springs 91 and the four support columns 624. The first springs 91 correspond to the four support columns 624 on a one-to-one basis. Each support column 624 is inserted into a corresponding one of the coil parts 911 of the first springs 91. Thus, the first spring 91 is rotatably supported by the support column 624. The arm 912 has a bar-like shape. As described later, the arm 912 pushes the brush 81 in a first direction S1 toward the commutator 3. The arm 912 is folded to have a hook-shaped section at an opposite end from the coil part 911. In the following description, the first spring 91 has one end 915 which comes into contact with the brush 81 and which is a folded part of the hook-shaped section of the arm 912. The hook-shaped section of the arm 912 has a part 916 at a tip end side of the folded part. The part 916 is out of contact with the brush 81 and is thus not part of the one end 915, which comes into contact with the brush 81, of the first spring 91.

As described above, a part (the one end 915) folded into the hook-shape having a curved surface of the arm 912 comes into contact with the brush 81, and therefore, the brush 81 and the arm 912 have an increased contact area therebetween as compared to the case where a tip end 917 of the hook-shaped section comes into contact with the brush 81. Thus, the brush 81 can be suppressed from being worn due to contact with the arm 912.

The brush housing part 7 (part of the end member 62 and the brush cover 82) corresponds to a guide section which defines at least part of a travel pathway of the brush 81 in the first direction S1. That is, the travel pathway of the brush 81 is along the first direction S1 substantially parallel to the longitudinal directions of the holder 622, the rib 623, the first side wall 821, and the second side wall 822.

The second spring 92 is a leaf spring. The second spring 92 is integrated with the second side wall 822 forming the guide section. This can reduce the number of components as compared to the case where the guide section and the second spring 92 are formed as separate components.

Moreover, the second spring 92 is integrated with the first side wall 821 and the second side wall 822 of the brush cover 82. The second spring 92 has an S-shaped side surface. That is, the second spring 92 has an S-shape when viewed in a thickness direction of the first side wall 821.

The second spring 92 has a first end 921 which is a fixed end connected to the second side wall 822. The second spring 92 has a second end 922 which is an open end. The second spring 92 has an intermediate part 920 between the first end 921 and the second end 922. The intermediate part 920 comes into contact with the brush 81. The second spring 92 pushes the brush 81 along a second direction S2 intersecting the first direction S1. In this embodiment, the holder 622 is disposed such that the brush 81 is located between the holder 622 and the second spring 92 in the second direction S2. That is, the second spring 92, the brush 81, and the holder 622 are aligned in this order in the second direction S2. Thus, the second spring 92 pushes the brush 81 along the second direction S2, thereby pushing the brush 81 against the holder 622. That is, the brush 81 is held between the holder 622 and the second spring 92. This restricts movement of the brush 81 in the first direction S1. As a result, the brush 81 difficultly moves in the first direction S1.

Of the second spring 92, a part (the intermediate part 920) which comes into contact with the brush 81 has a thickness direction along the second direction S2. Thus, the second spring 92 has a first surface 925 (see FIG. 6A) intersecting a thickness direction of the second spring 92, and the second spring 92 pushes the brush 81 by the first surface 925. More specifically, the second spring 92 pushes a side surface 813 along the longitudinal direction of the brush 81 (see FIG. 6A).

As illustrated in FIG. 4, the second spring 92 has a catch 923. The catch 923 is a recess formed at the second end 922 of the second spring 92. The arm 912 of the first spring 91 is hooked on the catch 923.

The second spring 92 receives resilient force applied from the first spring 91 and thus moves in the second direction S2. Thus, the second spring 92 pushes the brush 81 along the second direction S2. That is, while the second spring 92 receives the resilient force from the first spring 91, the second spring 92 pushes the brush 81 along the second direction S2. The magnitude of force by which the second spring 92 pushes the brush 81 along the second direction S2 is total force of the resilient force of the second spring 92 and force by which the first spring 91 pushes the second spring 92. Thus, the brush 81 is easily held as compared to the case where the brush 81 is held by only the resilient force of the second spring 92. Note that in the present embodiment, the second spring 92 is out of contact with the brush 81 when receiving no resilient force from the first spring 91. That is, the second spring 92 pushes the brush 81 along the second direction S2 only when the first spring 91 is hooked on the catch 923 of the second spring 92.

The arm 912 of the first spring 91 comes into contact with a bottom surface of the catch 923 (the recess), rather than a second surface 926 (see FIG. 6A) intersecting the thickness direction of the second spring 92, of the second spring 92. Thus, force by which the first spring 91 moves the second spring 92 in the second direction S2 is a component of force in a turning direction (a direction intersecting the second direction S2) of the arm 912 of the first spring 91. Therefore, it is possible to reduce the possibility that plastic deformation of the second spring 92, deformation of the brush cover 82, or the like occurs.

When the arm 912 of the first spring 91 is hooked on the catch 923, the first spring 91 is out of contact with the brush 81, and the second spring 92 comes into contact with the brush 81. Before the motor 1 is used, for example, when the motor 1 is shipped, the arm 912 of the first spring 91 is hooked on the catch 923. Thus, the force by which the second spring 92 pushes the brush 81 along the second direction S2 can restrict the movement of the brush 81 in the first direction S1.

Figure 5:
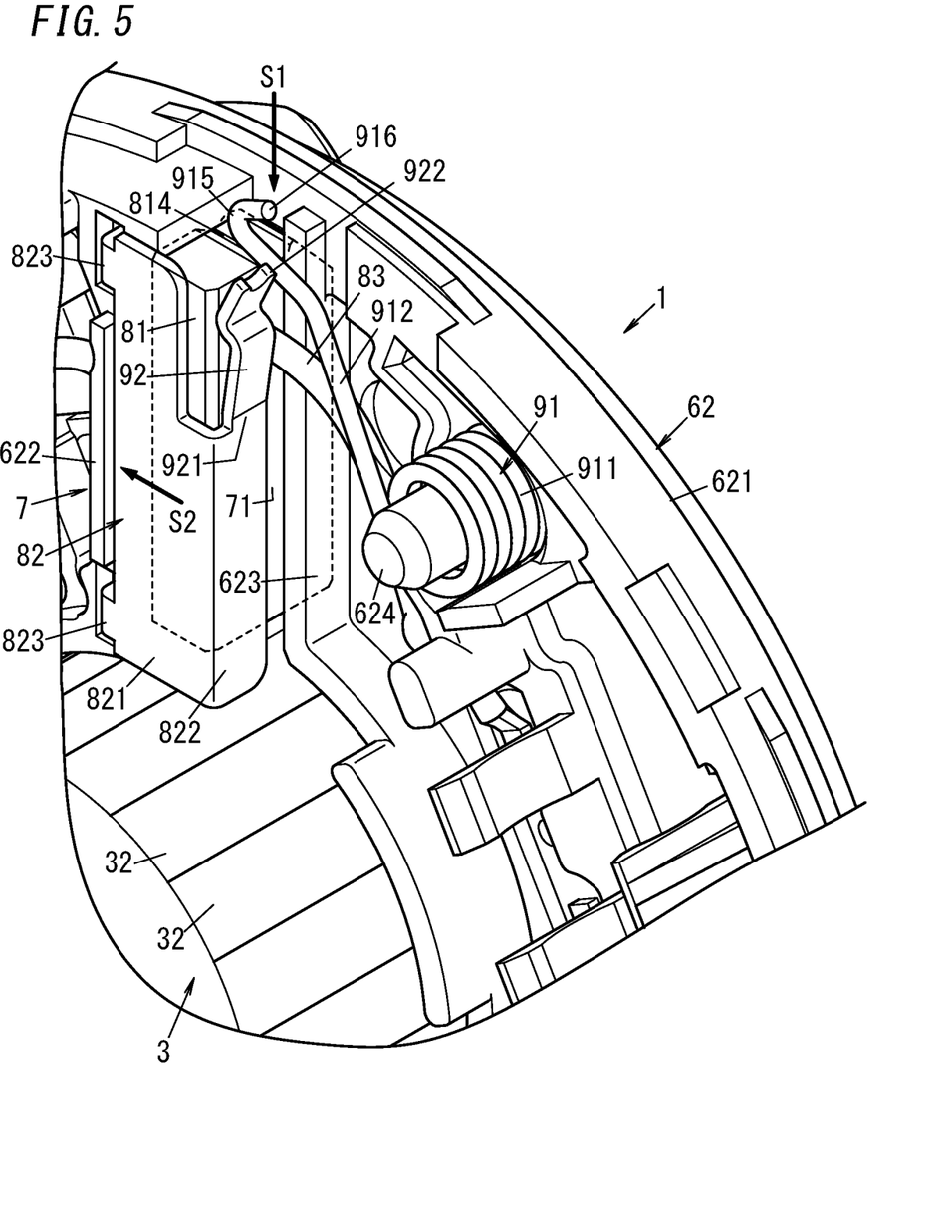
FIG. 5 is a perspective view illustrating a main part of the motor with first spring not being hooked on the second spring.

When the motor 1 is used, the arm 912 of the first spring 91 is released from the catch 923, for example, by a manual operation given by a person. Moreover, when the arm 912 receives force that shifts the location of the arm 912 in a depth direction with respect to the plane of FIG. 6A (in other words, in the thickness direction of the bottom plate 621), the first spring 91 comes into contact with the brush 81 as illustrated in FIG. 5. At this time, the first spring 91 pushes the brush 81 along the first direction S1. This can secure contact pressure between the brush 81 and the commutator 3.

Here, as illustrated in FIGS. 1 and 5, the brush housing part 7 has an opening section 71 through which the one end 915 (the first end), which comes into contact with the brush 81, of the first spring 91 is inserted from the exterior into the interior of the brush cover 82. That is, the first spring 91 is released from the catch 923 and is then brought into contact with the brush 81 through the opening section 71. The opening section 71 is formed between the rib 623 and the second side wall 822. The opening section 71 and the catch 923 are aligned in a direction (the depth direction with respect to the plane of FIG. 6A) intersecting a plane including the trajectory T1 (see FIG. 6A) of the one end 915 (the first end) of the first spring 91.

The brush 81 has a groove section 814 (see FIG. 1). The arm 912 of the first spring 91 is held in the groove section 814.

Figure 6A:
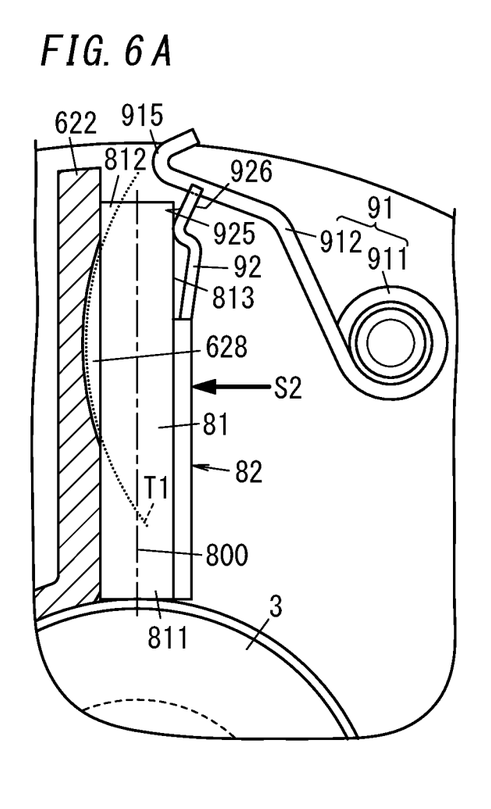
FIGS. 6A and 6B are sectional views each illustrating operation of the first spring in the motor.
Figure 6B:
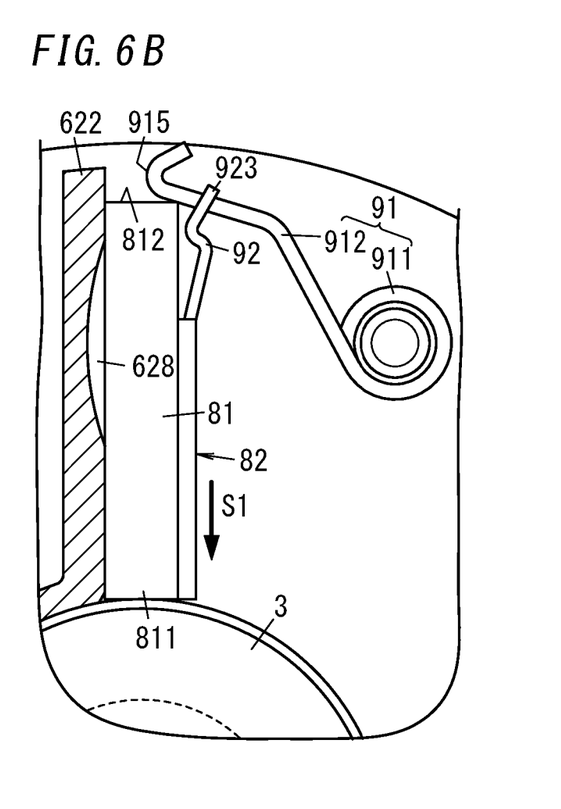
Figure 7A:
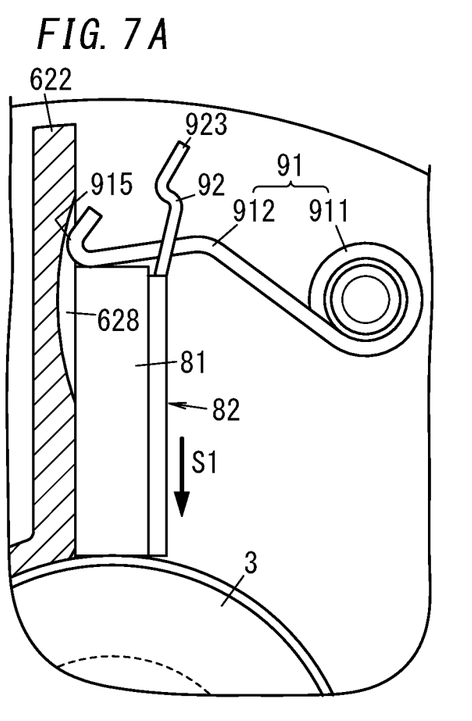
FIGS. 7A and 7B are sectional views each illustrating the operation of the first spring in the motor.
Figure 7B:
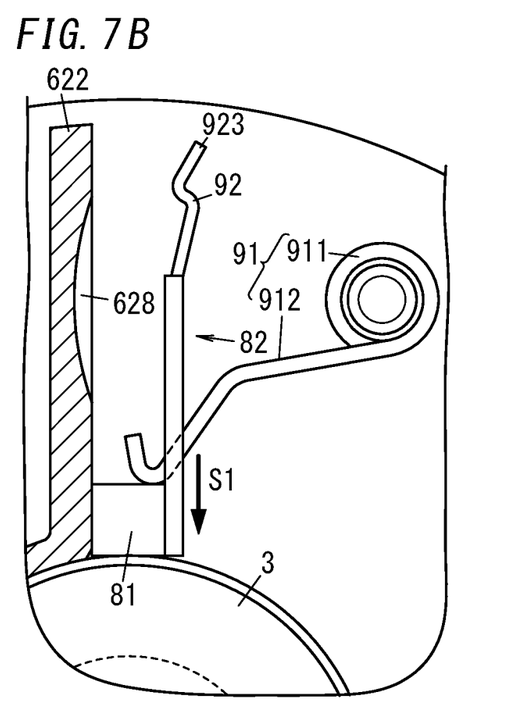

The brush 81 comes into contact with the commutator 3 which rotates, and therefore, the brush 81 may start to wear from its tip end 811 (see FIG. 6A) which comes into contact with the commutator 3. As the brush 81 wears, the one end 915 of the first spring 91 gradually turns anticlockwise about the coil part 911 by the resilient force of the first spring 91 itself. FIG. 6A shows a state before the motor 1 is used and the first spring 91 is hooked on the catch 923. FIG. 6B shows a state immediately after the first spring 91 is released from the catch 923 and the motor 1 is started to be used. In each of FIGS. 6A and 6B, the brush 81 is not worn. FIG. 7A shows a state where the motor 1 is used and the brush 81 is worn, and FIG. 7B shows a state where the brush 81 is further worn. That is, when the motor 1 is used, the first spring 91 turns anticlockwise in the order as shown in FIGS. 6B, 7A, and 7B.

In either of FIGS. 6B, 7A, and 7B, the arm 912 of the first spring 91 is in contact with an end 812 at an opposite side of the brush 81 from the tip end 811 which is in contact with the commutator 3, and the arm 912 pushes the brush 81 along the first direction S1 while the motor 1 is used. Thus, the first spring 91 moves the brush 81 along the first direction S1 by a distance corresponding to a worn part of the brush 81, thereby keeping the brush 81 in contact with the commutator 3.

The holder 622 forming an inner wall of the brush housing part 7 has a groove 628. The groove 628 is formed along the trajectory T1 of the one end 915 (the first end), which comes into contact with the brush 81, of the first spring 91. This suppresses the holder 622 from coming into contact with the one end 915 when the one end 915 of the first spring 91 turns. The trajectory T1 is a trajectory generated when the first spring 91 rotates about the coil part 911. That is, one part (the one end 915) of the first spring 91 moves along the first direction S1 while generating the trajectory T1 and pushes the brush 81, and in the course of moving of the one end 915 along the trajectory T1, the one end 915 passes through the groove 628 formed in the brush housing part 7.

The first spring 91 has the one end 915 (the first end), which comes into contact with the brush 81, and one end (the coil part 911) (a second end) at an opposite side from the one end 915. FIG. 6A shows the trajectory T1 of the one end 915, which comes into contact with the brush 81, of the first spring 91. At least part of the trajectory T1 extends beyond a center location of the brush 81 in a direction along the second direction S2 when viewed from the one end (the coil part 911) (the second end) at an opposite side of the one end 915 (the first end), which comes into contact with the brush 81, of the first spring 91. That is, the trajectory T1 extends beyond a straight line 800 which bisects the brush 81 in the second direction S2 when viewed from the coil part 911. The trajectory T1 of the one end 915 of the first spring 91 is a trajectory generated from a start of use of the brush 81 until required replacement of the brush 81. The one end 915 of the first spring 91 moves on the trajectory T1 unless force is directly applied to the first spring 91.

In this embodiment, part of the trajectory T1 extends beyond the center location of the brush 81 in the direction along the second direction S2 when viewed from the coil part 911. In contrast, the entirety of the trajectory T1 may extend beyond the center location of the brush 81 in the direction along the second direction S2 when viewed from the coil part 911.

The width of the groove 628 is smaller than the width of the brush 81 in a direction (the depth direction with respect to the paper sheet of FIG. 6A) orthogonal to a plane including the trajectory T1.

In the motor 1 of the present embodiment, the arm 912 of the first spring 91 has an increased movable range as compared to the case where the one end 915 of the first spring 91 is brought into contact with the side surface 813 of the brush 81, the side surface 813 being along the longitudinal direction of the brush 81. That is, the motor 1 of the present embodiment has an increased length of the trajectory T1. This is because the one end 915 of the first spring 91 is brought into contact with the end 812 of the brush 81, rather than the side surface 813 of the brush 81, which enables the arm 912 to have a further increased length in the motor 1 of the present embodiment. Since the arm 912 has a further increased length, the trajectory T1 can extend beyond the center location of the brush 81 in the direction along the second direction S2 when viewed from the coil part 911. That is, the arm 912 can have an increased movable range. The increased movable range of the arm 912 easily secures the contact pressure between the brush 81 and the commutator 3 even when the brush 81 is worn. This can extend a time period (i.e., the service life of the brush 81) from a start of use of the brush 81 until required replacement of the brush 81.

Before the motor 1 is mounted on another apparatus, the arm 912 of the first spring 91 is kept being hooked on the catch 923 of the second spring 92 and holds the brush 81 between the second spring 92 and the holder 622. This can reduce the possibility that the brush 81 is moved by a vibration applied to the motor 1, for example, while the motor 1 is transported or stored. When the motor 1 is mounted to another apparatus, the arm 912 of the first spring 91 is detached from the catch 923 of the second spring 92 to release the brush 81 from the second spring 92 and the holder 622 so that the brush 81 is to be pushed by the first spring 91 toward the commutator 3. This can secure contact pressure between the brush 81 and the commutator 3.

Variation

Next, variations of the embodiment will be described. The variations described below may be accordingly combined with each other.

The configuration of the motor 1 is applicable to an electricity generator.

The configuration which serves as a rotor in the embodiment may be a stator, and the configuration which serves as a stator in the embodiment may be a rotor.

The number of the brushes 81 is not limited to four, but two, three, or five or more brushes 81 may be provided. Accordingly, the number of first springs 91 and the number of second springs 92 may be two, three, or five or more.

Action of the first spring 91 on the second spring 92 is not essential, and the second spring 92 may hold the brush 81 between the second spring 92 and the holder 622 by only the resilient force of the second spring 92 itself.

When the second spring 92 does not receive the resilient force from the first spring 91, the resilient force of the second spring 92 itself may push the brush 81 along the second direction S2. That is, the second spring 92 may push the brush 81 along the second direction S2 also when the first spring 91 is not hooked on the catch 923 of the second spring 92. In this case, the magnitude of force by which the first spring 91 pushes the brush 81 along the first direction S1 is preferably greater than the magnitude of force by which the second spring 92 pushes the brush 81 along the second direction S2 to restrict movement of the brush 81 in the first direction S1.

Alternatively, the second spring 92 may be configured to: when the second spring 92 receives no resilient force from the first spring 91, push the brush 81 along the second direction S2 by the resilient force of the second spring 92 itself; be plastically deformed and thus be separated from the brush 81; and no longer push the brush 81 along the second direction S2. In this configuration, the second spring 92 is at least plastically deformed manually, for example, with a tool.

SUMMARY

The embodiment and the like described above discloses the following aspects.

The motor 1 according to the first aspect includes a commutator 3, a brush 81, a first spring 91, a second spring 92, and a holder 622. The brush 81 is configured to come into contact with the commutator 3 to be electrically connected to the commutator 3. The first spring 91 is configured to push the brush 81 along a first direction S1 toward the commutator 3. The second spring 92 is configured to push the brush 81 along a second direction S2 intersecting the first direction S1. The holder 622 is disposed such that the brush 81 is located between the holder 622 and the second spring 92 in the second direction S2. The holder 622 is configured to hold the brush 81 between the holder 622 and the second spring 92.

This configuration enables the brush 81 to be easily held as compared to the case where the motor 1 includes no second spring 92 and the brush 81 is held by the resilient force of the first spring 91.

Moreover, in a motor 1 of the second aspect according to the first aspect, the first spring 91 is a helical torsion spring.

With this configuration, the first spring 91 is easily downsized.

Moreover, in a motor 1 according to a third aspect according to the first or second aspect, the first spring 91 has a first end (one end 915) which comes into contact with the brush 81 and a second end (a coil part 911) at an opposite side from the first end (the one end 915). At least part of a trajectory T1 of the first end (the one end 915) extends beyond a center location of the brush 81 in a direction along the second direction S2 when viewed from the second end (the coil part 911).

This configuration provides an increased movable range while the one end 915, which comes into contact with the brush 81, of the first spring 91 is kept in contact with the brush 81 as compared to the case where the trajectory T1 does not extend beyond a center location of the brush 81 in the direction along the second direction S2 when viewed from the coil part 911.

Moreover, a motor 1 of a fourth aspect referring to any one of the first to third aspects further includes a guide section (a brush housing part 7). The guide section includes the holder 622. The guide section defines at least part of a travel pathway of the brush 81 in the first direction S1. The second spring 92 is integrated with the guide section.

This configuration can reduce the number of components as compared to the case where the guide section (the brush housing part 7) and the second spring 92 are formed as separate components.

Moreover, in a motor 1 of a fifth aspect referring to any one of the first to fourth aspects, the second spring 92 is a leaf spring. The second spring 92 has a part which comes into contact with the brush 81 and which has a thickness direction along the second direction S2.

This configuration enables the part, which comes into contact with the brush 81, of the second spring 92 to come into contact with the brush 81 at a surface (a first surface 925) of the second spring 92, the surface intersecting the thickness direction of the part. This enables the second spring 92 and the brush 81 to have an increased contact area therebetween as compared to the case where the second spring 92 and the brush 81 come into contact with each other at one point.

Moreover, in a motor 1 of a sixth aspect referring to the fifth aspect, the second spring 92 has a catch 923. The first spring 91 is to be hooked on the catch 923. The second spring 92 is configured to push the brush 81 along the second direction S2 while the second spring 92 receives resilient force from the first spring 91.

With this configuration, the second spring 92 pushes the brush 81 along the second direction S2 while the second spring 92 receives the resilient force from the first spring 91. Thus, the magnitude of force by which the second spring 92 pushes the brush 81 along the second direction S2 is total force of the resilient force of the second spring 92 and force by which the first spring 91 pushes the second spring 92. Therefore, the brush 81 is held more easily than in the case of holding the brush 81 by only the resilient force of the second spring 92.

Moreover, in a motor 1 of a seventh aspect referring to the sixth aspect, the first spring 91 is out of contact with the brush 81 and the second spring 92 is in contact with the brush 81 when the first spring 91 is hooked on the catch 923.

This configuration can reduce the possibility that when the first spring 91 is hooked on the catch 923, the resilient force of the first spring 91 pushes the brush 81 in the first direction S1.

Moreover, a motor 1 of an eighth aspect referring to the sixth or seventh aspect further includes a brush housing part 7. The brush housing part 7 houses the brush 81. The first spring 91 has a first end (one end 915) which comes into contact with the brush 81 and a second end (a coil part 911) at an opposite side from the first end (the one end 915). The brush housing part 7 has an opening section 71. The first end (the one end 915) passes through the opening section 71 from an exterior to an interior of the brush housing part 7. The opening section 71 and the catch 923 are aligned in a direction intersecting a plane including a trajectory T1 of the first end (the one end 915).

This configuration causes the one end 915 of the first spring 91 to come into contact with the brush 81 through the opening section 71 without removing the second spring 92 or plastically deforming the second spring 92.

Moreover, a motor 1 of a ninth aspect referring to any one of the first to eighth aspects further includes a brush housing part 7. The brush housing part 7 houses the brush 81. The first spring 91 has a first end (one end 915) which comes into contact with the brush 81 and a second end (a coil part 911) at an opposite side from the first end (the one end 915). The brush housing part 7 has an opening section 71. The first end (the one end 915) passes through the opening section 71 from an exterior to an interior of the brush housing part 7. The brush housing part 7 has an inner wall (a holder 622) having a groove 628 formed along a trajectory T1 of the first end (the one end 915).

This configuration can reduce the possibility that the inner wall (the holder 622) of the brush housing part 7 and the one end 915 of the first spring 91 come into contact with each other.

The configurations other than the configuration of the first aspect are not essential configurations of the motor 1 and may accordingly be omitted.

A brush housing part 7 of a tenth aspect is applicable to a motor 1 and houses a brush 81. The motor 1 includes the brush 81 and a first spring 91 having a part (one end 915) configured to move along a first direction S1 while generating a prescribed trajectory T1 and push the brush 81. The brush housing part 7 has a groove 628 through which the part (the one end 915) passes in the course of moving of the part (the one end 915) along the prescribed trajectory T1.

This configuration can reduce the possibility that the brush housing part 7 and the first spring 91 come into contact with each other. Thus, the brush housing part 7 easily holds the brush 81.

The configuration of the tenth aspect is applicable in appropriate combination with the configurations of the first to ninth aspect.

The following eleventh and twelfth aspects of the motor 1 is applicable without requiring all elements of the first aspect.

The motor 1 of an eleventh aspect includes a commutator 3, a brush 81, a holding mechanism (a second spring 92), and a guide section (a brush housing part 7). The brush 81 is configured to come into contact with the commutator 3 to be electrically connected to the commutator 3. The holding mechanism (the second spring 92) is configured to hold the brush 81. The guide section (the brush housing part 7) defines at least part of a travel pathway of the brush 81 in a first direction S1 toward the commutator 3. The holding mechanism (the second spring 92) is integrated with the guide section (the brush housing part 7).

This configuration can reduce the number of components as compared to a case where the guide section (the brush housing part 7) and the holding mechanism (the second spring 92) are formed as separate components.

In the eleventh aspect, the holding mechanism is at least configured to hold the brush 81 and may be a component other than the second spring 92. The holding mechanism may be, for example, a pin instead of the second spring 92. The brush 81 is held by insertion of the pin in a hole formed in the brush 81.

In a motor 1 of a twelfth aspect referring to the eleventh aspect, the holding mechanism is a spring (the second spring 92). The guide section (the brush housing part 7) includes a holder 622. The holder 622 is disposed such that the brush 81 is located between the holder 622 and the spring (the second spring 92 in the second direction S2). The spring (the second spring 92) pushes the brush 81 along a second direction S2 to hold the brush 81 between the spring and the holder 622. The second direction S2 is a direction intersecting the first direction S1.

With this configuration, the brush 81 can be held by the resilient force of the spring (the second spring 92).

Moreover, the configurations of the second, third, and fifth to tenth aspects are applicable in appropriate combination with the motor 1 of the eleventh and twelfth aspects.

REFERENCE SIGNS LIST

1 MOTOR
3 COMMUTATOR
622 HOLDER (INNER WALL)
7 BRUSH HOUSING PART (GUIDE SECTION)
71 OPENING SECTION
81 BRUSH
91 FIRST SPRING
911 COIL PART (SECOND END)
915 ONE END (FIRST END)
92 SECOND SPRING
923 CATCH
S1 FIRST DIRECTION
S2 SECOND DIRECTION
T1 TRAJECTORY

The invention claimed is:

1. A motor, comprising:
a commutator;
a brush configured to come into contact with the commutator to be electrically connected to the commutator;
a first spring configured to push the brush along a first direction toward the commutator;
a second spring configured to push the brush along a second direction intersecting the first direction; and
a holder disposed such that the brush is located between the holder and the second spring in the second direction, the holder being configured to hold the brush between the holder and the second spring, wherein:
the second spring is a leaf spring,
the second spring has a part which comes into contact with the brush and which has a thickness direction along the second direction,
the second spring has a catch on which the first spring is to be hooked, and
the second spring is configured to push the brush along the second direction while the second spring receives resilient force from the first spring.

2. A motor of claim 1, wherein
the first spring is a helical torsion spring.

3. The motor of claim 1, wherein:
the first spring has:
a first end which moves along the first direction while generating a prescribed trajectory and comes into contact with the brush, and
a second end at an opposite side from the first end, and
at least part of the prescribed trajectory of the first end extends beyond a center location of the brush in a direction along the second direction when viewed from the second end.

4. The motor of claim 1, further comprising: a guide section including the holder and defining at least part of a travel pathway of the brush in the first direction, wherein
the second spring is integrated with the guide section.

5. The motor of claim 1, wherein
the first spring is out of contact with the brush and the second spring is in contact with the brush when the first spring is hooked on the catch.

6. The motor of claim 5, further comprising a brush housing part housing the brush, wherein
the first spring has:
a first end which moves along the first direction while generating a prescribed trajectory and comes into contact with the brush, and
a second end at an opposite side from the first end,
the brush housing part has an opening section through which the first end passes from an exterior to an interior of the brush housing part, and
the opening section and the catch are aligned in a direction intersecting a plane including the prescribed trajectory of the first end.

7. The motor of claim 1, further comprising a brush housing part housing the brush, wherein:
the first spring has:
a first end which moves along the first direction while generating a prescribed trajectory and comes into contact with the brush, and
a second end at an opposite side from the first end,
the brush housing part has an opening section through which the first end passes from an exterior to an interior of the brush housing part, and
the opening section and the catch are aligned in a direction intersecting a plane including the prescribed trajectory of the first end.

8. The motor of claim 1, further comprising a brush housing part housing the brush, wherein
the first spring has
a first end which moves along the first direction while generating a prescribed trajectory and comes into contact with the brush, and a second end at an opposite side from the first end,
the brush housing part has an opening section through which the first end passes from an exterior to an interior of the brush housing part, and
the brush housing part has an inner wall having a groove formed along the prescribed trajectory of the first end.

\* \* \* \* \*